Patented Apr. 16, 1935

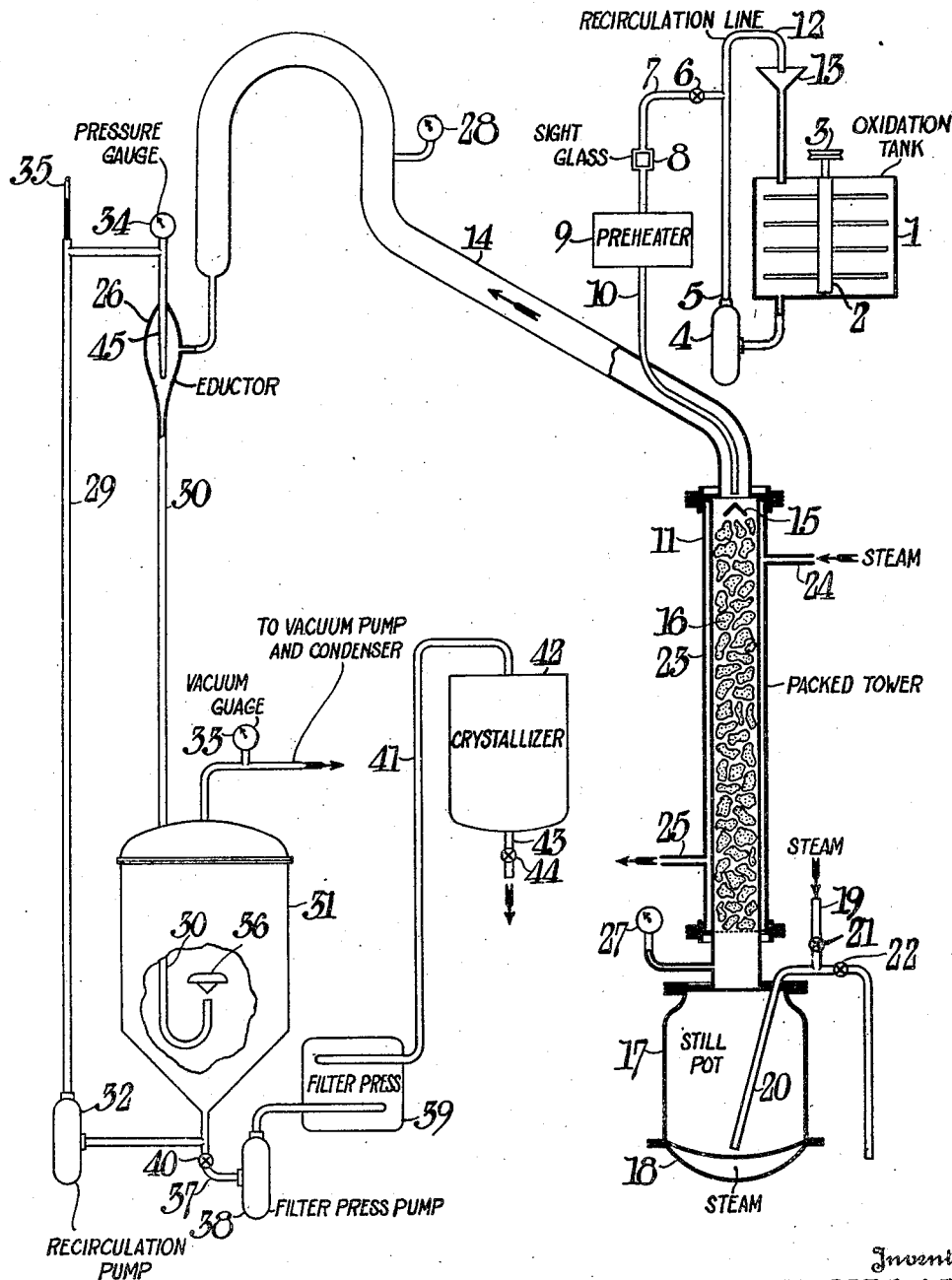

1,998,177

UNITED STATES PATENT OFFICE 1,998,177

PRODUCTION OF HYDROQUINONES

Harold Von Bramer and John W. Zabriskie, Kingsport, Tenn., assignors to Eastman Kodak Company, Rochester, N. Y., a corporation of New York Application April 25, 1934, Serial No. 722,346

14 Claims. (Cl. 260—154)

This invention relates to the production of hydroquinones, such as hydroquinone and toluhydroquinone, and more particularly to the preparation of these compounds by the reduction of the corresponding quinones under reduced pressure.

In our prior U. S. Patent No. 1,880,534 issued October 4, 1932 we have described a process for the production of hydroquinone by vaporizing quinone out of contact with reactive gases and then intermingling the quinone vapors with a reducing agent. One form of that invention comprises steam distilling the quinone and conducting the mixture of quinone and water in the vapor phase through an eductor and into intimate contact with a recirculating reducing liquid comprising a suspension of iron dust in water. By that process we are enabled to obtain much higher yields than are possible with prior art processes and a product of a fairly high, although not absolute purity.

We have now found that hydroquinones of an unusual and heretofore unattainable degree of purity are obtainable and that high yields and a much greater efficiency of operation are possible by employing the process herein described which represents a marked improvement on, and in several aspects a radical departure from, the process of our above mentioned application and from the prior art. We have also discovered that the quinones in general, such as quinone and toluquinone are susceptible of conversion to the corresponding hydroquinone, toluhydroquinone, etc., by means of our process.

It is accordingly the principal object of the present invention to improve upon prior processes for the production of hydroquinone and its homologues and to provide a process having a greater over-all efficiency and giving the desired product in higher yields than were heretofore attainable. A further object is to provide a process whereby water-white, saturated aqueous solutions of 100 per cent pure hydroquinones may be obtained simply and directly. A still further object is to provide a method of obtaining absolutely pure hydroquinone and its homologues in crystalline form without exposure to oxidizing or decomposing influences of any kind. Other objects will appear hereinafter.

These objects are accomplished by the following invention which, in its broader aspects, comprises vaporizing quinone and passing the quinone vapors into intimate contact with a stream of recirculating reducing agent and condensing the quinone vapors at the instant of contact with the reducing agent. We have discovered that only when the quinone vapors are instantly condensed and immediately reduced to the corresponding hydroquinone can a product of absolute purity and water-white clarity be obtained. Although we offer no theory or explanation of the phenomenally good yields obtainable, the extremely high quality of the product, and the efficiency of process, these features are apparently attributable to the fact that the quinone undergoes instantaneous reduction in solution as distinguished from the vapor phase, thereby providing a much more intimate contact between the quinone and the reducing agent.

In the following examples and description we have set forth several of the preferred embodiments of our invention, but it is to be understood that they are included merely for purposes of illustration and not as a limitation thereof.

It will be evident that the first step in our process is the production of the desired quinone, say quinone or toluquinone. This may be accomplished by methods known to the prior art, one of which (in the case of quinone) is the oxidation of aniline by means of manganese dioxide or sodium or potassium dichromate, in the presence of aqueous sulphuric acid. We may for example, employ the following ingredients in parts by weight:

Technical aniline_____ 13
Manganese dioxide_____ 37
Sulphuric acid (93%)_____ 64
Water _____ 224

This mixture may be stirred for a 20 hour reaction time at a temperature which may be maintained at 0–5° C. In order to reduce the quinone which may be distilled from this reaction mixture we have found that approximately 10 parts of iron dust should be employed which is, of course, an excess to insure complete reduction of the quinone. This amount of iron dust may be conveniently suspended in approximately 80 parts of water to form the reducing liquid. This proportion of water is sufficient to completely dissolve all the hydroquinone formed without having too great an excess. It may be said that the amount of water should be adjusted so that during reduction of the quinone, a saturated solution of hydroquinone will be obtained at the end of the run as will be more particularly described hereinafter.

Another reaction mixture may contain in parts by weight:

Aniline_____ 25
Sodium dichromate_____ 75
Sulphuric acid_____ 200
Water_____ 900

With such a mixture approximately 20 parts of iron dust and 160 parts of water may be employed as the reducing liquid. It may be said at this point that, although we find (contrary to the indications of the technical literature) a suspension of iron dust alone gives complete reduction of the quinone to hydroquinone, we may add to the suspension other reducing materials, such as ferrous sulphate, for example, or we may even entirely replace the iron dust by other reducing agents.

In case of other members of the quinone family such as toluquinone, xyloquinone, etc., they may be employed in reaction mixtures similar to those indicated above, the amounts of the various ingredients being proportioned in accordance with the molecular weights of the respective compounds dealt with.

The quinone produced as just described (in solution in its reaction mixture) is preferably preheated to the temperature of low pressure steam and then steam distilled from the reaction mixture, preferably under reduced pressure, and the mixture of quinone and water vapor is conducted immediately to an eductor or equivalent suction device where it meets a circulating current of reducing liquid or agent, such as the above-mentioned aqueous suspension of iron dust, and where the quinone and steam vapors, due to the comparatively low temperature of the recirculating reducing liquid and the comparatively high vacuum maintained on the reducing system, are instantly converted or condensed to the liquid phase, thereby giving up their heat to the reducing liquid. The condensation of the vapors obviously forms momentarily, an aqueous solution of quinone which is at that instant reduced to hydroquinone and the mixture of water and dissolved hydroquinone passes to a vacuum tank wherein the greater proportion of the condensed steam which has entered the system from the steam distillation step, flashes into steam due to the fact that heat has been acquired by the liquid in the condensation of the vapors and the fact that it is subjected to the vacuum of the reducer. This water vapor is removed by a vacuum pump and condenser, while the hydroquinone, being non-volatile, remains behind in the iron-water slurry. The process is continued until all, or nearly all, of the iron dust has been oxidized to iron oxides, whereupon the process is stopped and the saturated solution of hydroquinone in the reducing tank is filtered to remove the iron oxides and any excess of metallic iron that may be present. This solution is then passed immediately, and without exposure to the air or other oxidizing influences, to a crystallizer where the hydroquinone is crystallized therefrom in a known manner.

Our process will best be illustrated by reference to the accompanying drawing in which we have shown one of the preferred embodiments thereof.

Referring to the drawing in which one suitable type of apparatus is illustrated, numeral 1 designates the oxidation tank for carrying out the oxidation of the aniline or other benzene derivative which constitutes the starting material for the desired quinone. For convenience of illustration, but without in any way limiting our invention thereto, we will describe our process by reference to the manufacture of hydroquinone. Accordingly, it may be assumed, that the tank 1 contains a reaction mixture such as described above, comprising a mixture of 13 parts by weight aniline, 37 parts manganese dioxide, 64 parts sulphuric acid (93%) and 224 parts of water. The reaction mixture may be suitably agitated by means of a stirring device 2, suitably mounted in tank 1 (by means not shown) and driven by pulley 3, rotated by a source of power (also not shown).

Pump 4 is adapted to remove the reaction liquid from tank 1 and conduct it through conduit 5, thence by means of valve 6 and conduit 7 provided with sight glass 8 to pre-heater 9, thence through line 10 into the top of the packed tower 11.

Conduit 5 is also provided with return line 12 adapted to discharge the excess liquid circulated by pump 4 which has not passed to the preheater into funnel 13 and thence back into the reaction tank 1. It will be noted that conduit 10 enters a larger conduit 14, protruding in a sloping direction from the top of the packed tower 11, and that the quinone reaction mixture, upon leaving the preheater, enters the tower 11 through a section of the conduit 10 which is surrounded by conduit 14. After leaving the conduit 10 the liquid impinges upon baffle plate 15, located in the upper part of the tower 11 where it is partially broken up, thence passing downwardly over pieces of charcoal or other suitable material 16 with which the tower is filled, finally finding its way to the still pot 17.

The still pot 17 is provided with means for indirect heating of the reaction mixture such as steam jacket 18. (Steam coils may also be used if desired.) The still pot is also provided with steam line 19 by means of which live steam may be injected into the interior of the device through branch 20. Valves 21 and 22 are provided for controlling the passage of the steam and for venting the still pot as may be desired. The packed tower 11 is also provided with steam jacket 23 supplied with steam through inlet 24 which passes therefrom through outlet 25.

The quinone and steam vapors, rising from the tower 11, pass through conduit 14 and thence to eductor 26. A vacuum of about 5 to 10 inches of mercury is maintained within the system, comprising the still pot, packed tower and conduit 14 because of the aspirating effect of the eductor 26, the vacuum in the various parts of the system being indicated by vacuum gauges 27, 28 and 33. The temperature of the distilling vapors is in the vicinity of 90 to 95° C., corresponding to the particular degree of vacuum employed, which as will be explained hereinafter, may conveniently be 5–10 inches of mercury.

The quinone and steam vapors enter the eductor 26, a portion of which has been broken away to show the interior construction thereof, where they meet an aqueous slurry or suspension of iron dust circulated through conduit 29, eductor 26, reduction line 30 and vacuum tank 31, circulation being maintained by pump 32. Vacuum tank 31 is provided with appropriate means for maintaining the necessary vacuum within the tank, such means comprising, for example, a suitable vacuum pump and condenser (not shown). The pressure within tank 31 may be indicated by vacuum gauge 33. Similarly, the pressure of the circulating suspension in line 29 may be indicated by a pressure gauge 34, the temperature of this material being indicated by thermometer 35, located in the top of conduit 29. Tank 31 is also provided with baffle 36, the function of which will be explained hereinafter.

Tank 31 is also provided with take-off conduit 37 connected to pump 38 which conveys the fluid from tank 31 to filter press 39, the flow of fluid to the pump being controlled by means of valve 40. In the filter press 39 the solid matter suspended in the liquid is removed therefrom, the clear solution then passing by means of conduit 41 to crystallizer 42, from which the crystalline product is removed through outlet 43, controlled by valve 44.

Assuming that the tank 1 contains the above mentioned batch of quinone reaction mixture, the re-circulation of this mixture is started through the conduit 5 by means of pump 4. Re-circulation of the suspension of iron dust in water is also started through the conduit 29 and eductor 26 by means of pump 32. Steam is then emitted to the still pot 17 through valve 21 in line 19, while at the same time steam is admitted to the steam jacket 18 at the bottom of the still pot. Valve 6 is then opened and a small but steady stream of the quinone reaction mixture is withdrawn through conduit 5 and, after passing sight glass 8, is forced through pre-heater 9 wherein it is rapidly brought to a temperature of approximately 100° C. or slightly below, say, 90–95° C., and is permitted to flow through the line 10 into the tower 11 wherein it trickles down over the coke packing, counter current to the steam rising therethrough. The tower 11 may conveniently be from 8 to 10 feet in height to permit complete vaporization of the quinone from the reaction mixture. When the mixture leaves the tower 11 it is continuously volatilized by the direct and indirect steam applied thereto, thereby generating further steam to assist the process. It is not necessary that any of the sulphuric acid contained in the reaction mixture be carried over into the eductor and reduction line, although a certain portion of acid may pass off as vapor and mingle with the quinone and steam, if desired.

The quinone and steam vapors now enter eductor 26 from the conduit 14 in which latter, as previously indicated, they are maintained in accordance with our invention at a temperature of 90 to 95° C. and a vacuum of about 5 to 10 inches of mercury. In the eductor these vapors meet the stream of iron dust suspension forced up through conduit 29 by pump 32. The temperature of this recirculated stream is maintained at about 60 to 65° C. A vacuum of about 15 to 23 inches of mercury (although lower pressures may be employed) is maintained within vacuum tank 31 and this vacuum is communicated to the eductor through conduit 30.

As will be seen from the drawing, the vapors enter the eductor at a point just below the injector nozzle 45 and at this point are immediately condensed by contact with the relatively cool re-circulated liquid. It should be particularly noted that in accordance with our invention the temperature of the re-circulated reducing liquid is always maintained at such a degree as will accomplish the instantaneous condensation of the quinone and steam vapors entering the eductor. At this same instant of condensation, the quinone vapors are reduced. It should also be noted at this point that the actual reduction of the quinone takes place while the quinone is in solution in the condensed steam so that the reduction takes place in the liquid, as distinguished from the vapor phase. It is this liquid phase reduction which we believe to be responsible for the extreme efficiency of our process and the exceptional and unexpected purity of the product.

It may be said that the reduction is substantially complete in the eductor or, at any rate, is fully completed before the iron dust, water and quinone has completed its progress downwardly through conduit 30 to the vacuum tank 31. Upon reaching the interior of the vacuum tank 31, the mixture is thrown against baffle 36 where, under the influence of the relatively high vacuum prevailing in the tank, and the increase in heat due to the giving up to the recirculating stream of heat units by the condensing vapors, the condensed steam is re-vaporized and passes off to a condenser and vacuum pump. The hydroquinone formed in the reduction, being non-volatile, remains in the iron-water slurry.

When the iron has nearly all been oxidized to iron oxides, the quinone distillation is stopped, the vacuum is released and the circulating pump 32 is shut down. Valve 40 is then opened, the press pump 38 immediately started, and the liquid pumped from the tank 31 through press 39 which removed the oxides of iron and any excess of metallic iron that may be present. In carrying out our process as just described, a water-white saturated solution of hydroquinone is obtained, and this passes from the filter press 39 through conduit 41 into the crystallizer 42 where the hydroquinone is crystallized according to known procedure.

It will be seen from the above description that our invention depends for its effectiveness upon maintaining the temperature of the re-circulating reducing liquid at the proper degree; this degree, in turn depends upon the pressure maintained within the vacuum tank 31 and therefore communicated to the eductor 26 and reduction conduit 30, as it is obvious that the higher the vacuum, the lower may be the temperature of the recirculating liquid and still obtain flashing off of the condensed steam. This feature of controlling the temperature by means of vacuum in such a process has a number of outstanding advantages. In the first place, keeping the temperature below the temperature of the quinone and steam vapors absolutely prevents any oxidation, decomposition or polymerization of the hydroquinone formed in the reaction, thus making possible 100 per cent pure water-white product. Not only does the reduction of pressure and, therefore, temperature, insure against decomposition of the product, but it enables immediate removal of the excess of water introduced into the recirculating stream from the steam in the original quinone vapor mixture, since this steam is immediately re-vaporized in the vacuum tank and removed therefrom. In other words the condensation of the steam (from the quinone vapor mixture) and the subsequent revaporization of that condensed steam is effected automatically by maintaining the proper difference (reduction) of pressure between the reduced tank 31 and vapor line 14. We have found that 5 inches of mercury is about the least difference in pressure that should be employed and that the difference may be as much as 15 to even 20 inches of mercury. At the same time, the recirculated reduction liquid is cooled by the revaporization of the condensed steam and again brought to the proper condensing temperature of 60 to 65° C., before it is again re-introduced into the eductor by means of the circulating pump 32.

Although we have described our invention with particular reference to a vacuum system for obtaining the necessary comparatively low condensing temperature of the reducing liquid, the same broad principle of our invention is involved in a modification of our process in which the re-circulated reducing liquid is maintained at the desired temperature by provision of a cooling coil, either surrounding the conduit supplying the eductor or contained within it. Although such a device would be adapted for reducing the quinone to hydroquinone, we prefer the type of apparatus and the operating conditions above described for the reason that it is not necessary to concentrate the hydroquinone liquor at the end of a run as would be the case with the use of a cooling coil in the re-circulating line. It is, of course, readily seen that if the condensing steam were permitted to accumulate and were not re-vaporized, the hydroquinone solution would become more and more dilute and concentration of this solution would be essential, and would involve another step in the process, thereby increasing the cost of manufacture.

It will be evident that we have provided a highly efficient process for the reduction of quinone to the corresponding hydroquinones in which the quinone is at all times protected from oxidizing or decomposing influences. Our process is a continuous process in which the temperature of the reaction components is at all times maintained below the decomposition temperature of the hydroquinone. In addition, by virtue of the vacuum conditions prevailing in the process, a perfectly clear, water-white, 100 percent pure, saturated solution of hydroquinone is obtained at the end of the run which may be easily crystallized without distillation or further concentration.

What we claim is:

1. The method which comprises vaporizing quinone at pressures below atmospheric out of contact with reactive gases and introducing the quinone vapors into a re-circulating stream of reducing agent which is maintained at a temperature at which the introduced quinone vapors will condense.

2. The method which comprises vaporizing the quinone under pressure below atmospheric out of contact with reactive gases and introducing the quinone vapors into a re-circulating stream of reducing agent which is maintained at the point of introduction at a temperature and under a pressure lower than the temperature and pressure of the introduced vapors.

3. The method of reducing a quinone to a hydroquinone which comprises introducing vapors of steam and quinone under a vacuum of 5 to 10 inches of mercury and at a temperature of 90 to 95° C. out of contact with reactive gases, into a re-circulating stream of reducing agent which is maintained at a temperature at which the introduced quinone and steam vapors will condense.

4. The method of reducing a quinone to a hydroquinone which comprises vaporizing quinone and steam under a vacuum of 5 to 10 inches and at a temperature of 90 to 95° C. out of contact with reactive gases, and introducing the quinone and steam vapors into a re-circulating stream of reducing agent which is maintained at a temperature below 90° C. and a vacuum of over 10 inches of mercury.

5. The method of producing hydroquinone which comprises steam distilling quinone from a solution containing it under a vacuum of 5 to 10 inches of mercury and at a temperature of 90 to 95° C. out of contact with reactive gases, and introducing the steam and quinone vapors into a recirculating stream of iron dust suspended in water at a point in the stream maintained under a vacuum of 15 to 23 inches of mercury and at a temperature of 60 to 65° C.

6. Method of reducing quinone to hydroquinone which comprises recirculating a reducing agent, maintained at a temperature at which introduced quinone and steam vapors will condense, from a zone of low pressure through a zone of high pressure, releasing the high pressure and introducing quinone and steam vapors into the reducing agent at approximately the point of release and out of contact with reactive gases and returning the mixture to the zone of low pressure.

7. Method of reducing quinone to hydroquinone which comprises recirculating a reducing agent, maintained at a temperature at which introduced quinone and steam vapors will condense, from a zone of low pressure through a zone of high pressure, releasing the high pressure and introducing quinone and steam vapors into the reducing agent at approximately the point of release and out of contact with reactive gases, and returning the mixture to the zone of low pressure and revaporizing and removing the condensed steam therefrom.

8. Method of reducing quinone to hydroquinone which comprises recirculating a reducing agent, maintained at a temperature at which introduced quinone and steam vapors will condense, from a zone of low pressure through a zone of high pressure, releasing the high pressure and introducing quinone and steam vapors into the reducing agent at approximately the point of release and out of contact with reactive gases, and returning the mixture to the zone of low pressure, removing a saturated solution of hydroquinone from the mixture and crystallizing pure hydroquinone from the solution.

9. The method of reducing a quinone to a hydroquinone which comprises vaporizing the quinone under pressure below atmospheric out of contact with reactive gases, and introducing the quinone vapors into a recirculating stream of reducing agent which is maintained at a temperature at which the introduced quinone vapors will condense and which is subjected to a vacuum of from 5 to 20 inches of mercury higher than the vacuum in which the quinone is vaporized.

10. In a method of producing a hydroquinone, the steps which comprise vaporizing a quinone out of contact with reactive gases, and introducing the quinone vapors into a recirculating aqueous stream which contains material which promotes the conversion of the quinone to a hydroquinone, said recirculating stream being maintained at the point of introduction of the quinone at a pressure lower than atmospheric pressure and at a temperature at which the quinone vapors will condense.

11. The method which comprises vaporizing a quinone out of contact with reactive gases and introducing the quinone vapors into a recirculating aqueous stream which contains material which promotes the conversion of the quinone to a hydroquinone, the stream being maintained at a temperature at which the quinone vapors will condense and being circulated from a zone of low pressure through a zone of high pressure, releasing the high pressure and introducing quinone and steam vapors into the reducing agent at approximately the point of release and out of contact with reactive gases and returning the mixture to the zone of low pressure.

12. The method which comprises vaporizing quinone out of contact with reactive gases and introducing the quinone vapors into a recirculating aqueous stream containing hydroquinone which is maintained, at the point of introduction, at a temperature at which the quinone vapors will condense and at a pressure lower than atmospheric.

13. The method which comprises vaporizing quinone under pressure below atmospheric and out of contact with reactive gases and introducing the quinone vapors into a recirculating aqueous stream containing hydroquinone which is circulated from a zone of low pressure through a zone of high pressure, releasing the high pressure and introducing quinone and steam vapors into the reducing agent at approximately the point of release and out of contact with reactive gases and returning the mixture to the zone of low pressure.

14. The method which comprises vaporizing quinone out of contact with reactive gases and introducing the quinone vapors into an aqueous solution containing hydroquinone, which solution is maintained at a temperature at which the quinone vapors will condense and at a pressure lower than atmospheric.

HAROLD von BRAMER.
JOHN W. ZABRISKIE.